Feb. 13, 1962   A. R. A. DAY   3,020,981
HYDRAULIC SHOCK ABSORBERS
Filed July 24, 1959
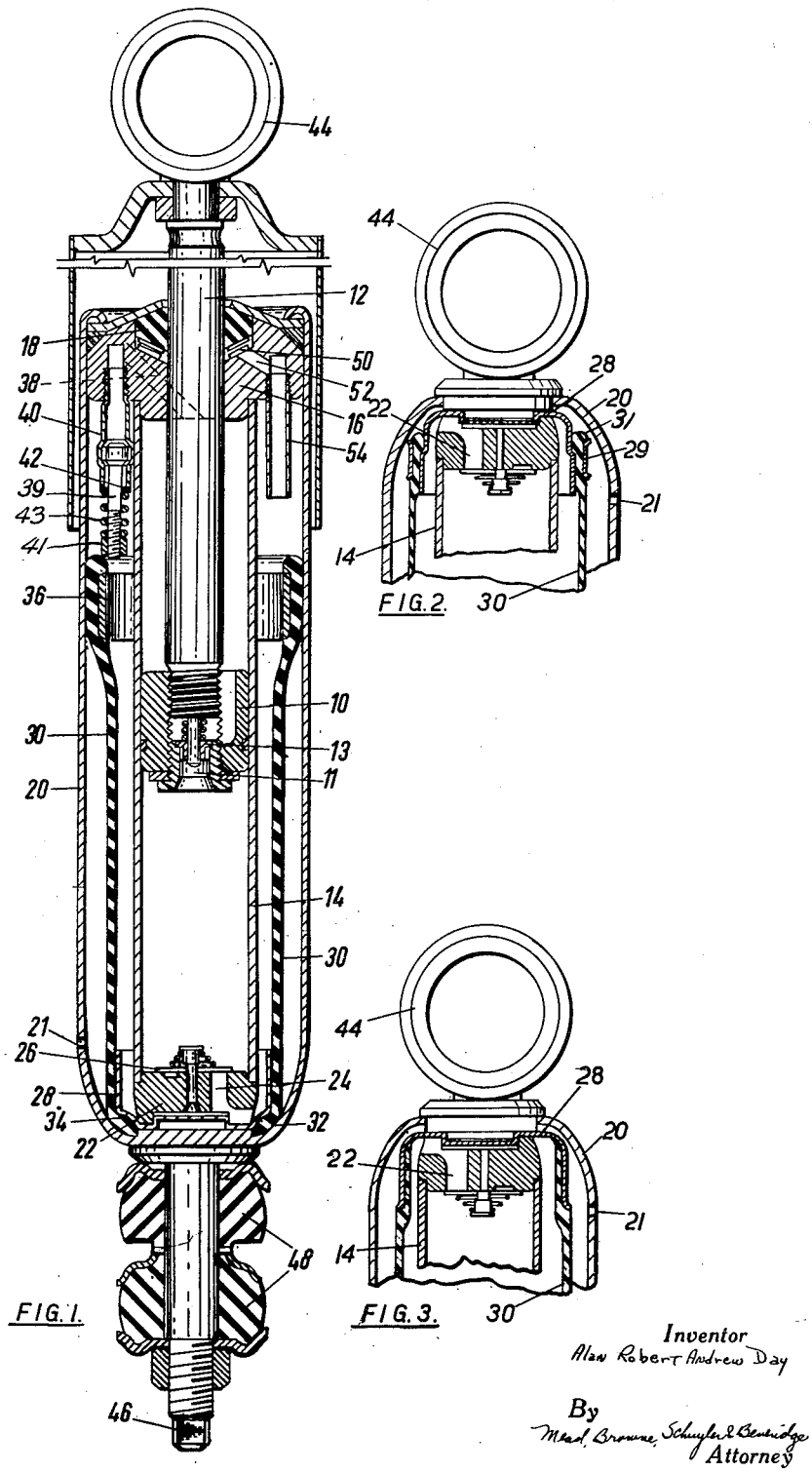
Inventor
Alan Robert Andrew Day
By
Mead, Browne, Schuyler & Beveridge
Attorney United States Patent Office 3,020,981
Patented Feb. 13, 1962

3,020,981
HYDRAULIC SHOCK ABSORBERS
Alan Robert Andrew Day, York, England, assignor to Armstrong Patents Co. Limited, Beverley, England
Filed July 24, 1959, Ser. No. 829,382
Claims priority, application Great Britain Aug. 1, 1958
2 Claims. (Cl. 188—100)

This invention relates to hydraulic shock absorbers of the type wherein a piston is displaceable in a hydraulic pressure cylinder responsive to motion of a sprung mass such as a vehicle body, and wherein the pressure cylinder is adapted to communicate with a hydraulic reservoir between which and said pressure cylinder a hydraulic damping medium e.g. oil, flows due to motion of the piston.

In a shock absorber of the type described, it is not possible completely to fill the reservoir with hydraulic damping medium due inter alia to the differential displacement of hydraulic medium from the pressure cylinder as the piston rod is introduced therein to various extents. Therefore it is conventional practice in such a reservoir to provide an air space. In one type of shock absorber, the hydraulic medium and air are stored together in the reservoir. Displacement of the piston in the pressure cylinder causes heating of the hydraulic medium due to passage of the medium through damping valves, but as the hydraulic medium comes into intimate contact with the outer walls of the reservoir, which are usually of thin metals, the excess heat can readily be dissipated into the atmosphere through the reservoir walls. However, as the hydraulic medium is also in intimate contact with the air in the reservoir, aeration of the hydraulic medium occurs when the shock absorber is shaken owing to movement of the vehicle within which it is mounted and a loss of efficiency results. Thus, the advantage gained by easy cooling of the hydraulic medium via the reservoir walls is, to a considerable extent, lost because of the hydraulic medium becoming aerated.

Aeration of the oil can be prevented by using a flexible diaphragm to separate the air in the reservoir tube from the hydraulic medium. However, the flexible diaphragm usually acts as a heat insulator, for example if made of rubber, and hence the hydraulic medium is separated from the walls of the reservoir by a heat insulating diaphragm and a layer of air. The result is that rapid dissipation of heat from the hydraulic medium to the atmosphere is effectively prevented.

It is an object of the invention to avoid or mitigate against these disadvantages in a shock absorber employing a flexible diaphragm.

According to the present invention a shock absorber of the type described incorporates a flexible diaphragm arranged to divide the reservoir space of the shock absorber into two separate chambers in such a way that the extent of the diaphragm is limited to a predetermined portion of the reservoir, hydraulic medium discharged from the pressure cylinder being passed directly into one of said chambers and the other chamber being vented to atmosphere.

The flexible diaphragm is preferably arranged to surround the intake end of the pressure cylinder.

Conveniently the flexible diaphragm may be arranged coaxially with and externally of the pressure cylinder to embrace a predetermined portion of the same, including the intake end of said pressure cylinder.

In one especially advantageous application of the invention, wherein the pressure cylinder is surrounded by a tubular member arranged coaxially with the pressure cylinder, and the reservoir space is defined between said pressure cylinder and said tubular member, one end of the flexible diaphragm encloses the intake end of the pressure cylinder and the other end of said flexible diaphragm is seated tightly against the inner wall of the tubular member at a position spaced apart from the discharge end of the pressure cylinder, the flexible diaphragm thus having a somewhat elongated configuration.

Preferably the pressure cylinder is arranged to discharge hydraulic medium into direct contact with the tubular member.

The invention will be described further by way of example and with reference to the accompanying drawings in which:

FIG. 1 is a sectional elevation of a tubular telescopic shock absorber embodying the invention, FIG. 2 is a fragmentary sectional elevation illustrating a modification of the shock absorber of FIG. 1, and FIG. 3 is a fragmentary sectional elevation illustrating a further modification of the shock absorber of FIG. 1.

In the shock absorber shown in FIG. 1 a piston 10 carried on a piston rod 12 is arranged for reciprocation in a metal pressure cylinder 14, the piston rod 12 passing out of one end of the cylinder through a head 16 incorporating a pressure oil seal 18. The head 16 is mounted within a metal outer tubular member 20 arranged co-axially with the pressure cylinder 14 and defining therewith an annular space constituting a reservoir space for hydraulic damping medium such as oil.

The end of the pressure cylinder remote from the head 16 is closed by the base member 22 formed with a bore 24 controlled by a spring loaded plate valve 26. The base member 22 carries a dished cup member 28 between which and the corresponding end of the tubular member 20 is tightly gripped one end of a flexible diaphragm 30, the latter being formed with an internal bead 32 adapted to co-operate with a recessed portion 34 of the cup member 28 to ensure a proper seating of the flexible diaphragm 30 against the end of the member 20.

The flexible diaphragm will be seen to be of elongated configuration extending through the reservoir space so as to embrace the pressure cylinder 14 in spaced relation thereto. It will be noted that the base end of the pressure cylinder is effectively enclosed by a corresponding end of the flexible diaphragm. Within a slightly recessed region of the opposite end of the flexible diaphragm there is engaged a rigid collar 36, the arrangement of which is such that when the several parts of the shock absorber above described are assembled together, the tubular member 20 may be subjected to a swaging operation to reduce its diameter and securely grip the said end of the flexible diaphragm in co-operation with the collar 36.

The self-centering plate valve 42 takes the form of an annular plate slideably mounted upon a spindle 39 one end of which is mounted within the tube 40. The other end of the spindle 39 is threaded and carries a nut 41 between which and the plate 42 is disposed a coiled spring 43 arranged concentrically with the spindle 39. The spring 43 is held in a state of compression between the nut 41 and the spindle 39 and serves to hold the plate 42 in closing contact with the lower end of the tube 40 in the absence of superior opposing fluid pressure within the tube 40. The pressure exerted by spring 43 upon the plate 42 may be adjusted by adjusting the position of nut 41 upon the spindle 39. The head 16 of the shock absorber further includes an oblique bore 38 communicating with a discharge tube 40, the lower end of which is closed by a self-centering plate valve 42, the oblique bore 38 communicating with the interior of the pressure cylinder 14 above the piston 10. The piston 10 is itself provided with a bore 11 allowing liquid flow through the piston, and the bore 11 is controlled by a spring loaded plate valve 13.

In the operation of the shock absorber described herein, the piston rod 12 is adapted to be connected as by an eye 44 to one part of a vehicle and the tubular member 20 and pressure cylinder 14 are similarly adapted, as by means of threaded studs 46 and rubber blocks 48 to be connected to another part of a vehicle. Vehicle riding movements such that the piston 10 is caused to be slightly withdrawn from the pressure cylinder 14 thus cause hydraulic damping medium in that cylinder and above the piston 10 to flow through the oblique bore 38, discharge tube 40 and valve 42 into the space between the pressure cylinder 14 and flexible diaphragm 30, this space thus constituting a reservoir chamber. At the same time, since such movement of the piston 10 causes the plate valve 13 to remain closed, hydraulic damping medium is drawn into the part of the pressure chamber 14 below the piston via plate valve 26 i.e. from the reservoir chamber. In the opposite direction of movement of the piston, the plate valve 26 remains closed but the plate valve 13 opens and therefore hydraulic damping medium is allowed to flow through the bore 11 in the piston, from one side thereof to the other. During this time however there is differential displacement of the hydraulic damping medium from the portion of the pressure cylinder 14 above the piston 10 due to the introduction of the piston rod 12, and hydraulic damping medium displaced in this way again flows to the reservoir chamber through the bore 38 and discharge tube 40.

Thus there is cyclic flow of hydraulic damping medium in one direction only through the shock absorber, and the flexible diaphragm 30 yields and expands as this cyclic flow takes place to allow for the varying volume of hydraulic damping medium contained in the reservoir space. However, it will be noted that the flexible diaphragm 30 does not define with the tubular member 20, a totally enclosed air chamber but that the member 20 is provided with a vent hole 21 whereby the air surrounding the flexible diaphragm 30 is always at atmospheric pressure. In this way the rise in temperature normally associated with a totally enclosed air chamber is avoided and the deleterious effects of high temperature on the flexible diaphragm are largely eliminated. A further advantage of the invention resides in the fact that since the air in the air chamber is not subjected to compression, this in turn relieves pressure from the oil seal 18.

It will be noted that the collar 36 holds the upper end of the diaphragm in fluid-tight contact with the inner surface of the metal outer tubular member 20 at a position spaced from the upper end of the pressure cylinder, thus enabling the hydraulic damping medium to come into direct contact with the wall of tubular member 20 so that excess heat possessed by the hydraulic medium may be rapidly dissipated to the atmosphere through the metal wall of tubular member 20. Moreover the heating of the hydraulic medium occurs due to its passage through the valves in the shock absorber, particularly the valve 42 of the discharge tube 40. Hydraulic medium leaving the discharge tube 40 via the valve 42 sprays directly onto the metal wall of the tubular member 20, thus achieving rapid cooling.

The head 16 is formed beneath the seal 18 with an annular chamber 50 from which extends a port 52 leading to a drain tube 54, the latter being of sufficient length to ensure that any oil draining therefrom will enter directly into the main body of hydraulic medium. It will be appreciated that the discharge tube 40 is also of a length such that hydraulic medium expelled therefrom will likewise enter directly into the main body of hydraulic medium in the reservoir chamber.

It will be appreciated that other methods may be used to secure the flexible diaphragm 30 to the cup member 28. Thus, in the construction of FIG. 2, the end of the diaphragm 30 is gripped between the outer surface of the cup member 28 and the inner surface of a metal band 29, concentric with the cup member, the cup member and the metal band being stepped or flanged to provide abutments for a bead 31 at the end of the diaphragm 30 whereby an adequate grip between the diaphragm and the cup member is obtained. Alternatively, as shown in FIG. 3, the end of the diaphragm 30 may be bonded to the inner surface of the cup member 28. In FIGS. 1, 2 and 3, like numbers refer to like parts.

The shock absorber of the present invention combines means for separating the hydraulic damping medium and air with means for rapidly cooling the hydraulic damping medium by providing a flexible separator diaphragm which extends over a limited portion of the length of the outer tubular member, and thus allowing the hydraulic medium to come into direct contact with the tubular member over a portion of its length.

I claim:
1. A hydraulic shock absorber comprising a pressure cylinder, a piston displaceable in said pressure cylinder, a tubular vessel surrounding the pressure cylinder and arranged coaxially with the pressure cylinder, a cylinder head arranged to close one end of the pressure cylinder and the tubular vessel, said cylinder head having a passage connecting the pressure cylinder with the tubular vessel, a discharge tube extending into the tubular vessel from said passage, a frusto-conical flexible diaphragm, a rigid collar having an external diameter smaller than the internal diameter of said tubular vessel and larger than the internal diameter of the large end of said frusto-conical flexible diaphragm, said collar being adapted to frictionally hold and seal said large end of said flexible diaphragm against said tubular vessel and below the discharge end of said discharge tube, an annular bead formed on the other end of said frusto-conical flexible diaphragm, a dished cup member having an annular recess complementary to and receiving said bead for securing the small end of said frusto-conical flexible diaphragm to an end of said tubular vessel, the wall of the tubular vessel being bored on the side of the diaphragm remote from the pressure cylinder.

2. A hydraulic shock absorber as defined in claim 1 wherein the internal diameter of said rigid collar is substantially larger than the external diameter of said pressure cylinder and forms therewith an annular passage to allow unobstructed flow of hydraulic medium.

References Cited in the file of this patent
UNITED STATES PATENTS

| | | |
|---|---|---|
| 2,048,285 | Padgett | July 21, 1936 |
| 2,538,375 | Montgomery | Jan. 16, 1951 |
| 2,628,692 | Hufferd | Feb. 17, 1953 |
| 2,672,952 | Smith | Mar. 23, 1954 |
| 2,802,550 | Chambers | Aug. 13, 1957 |
| 2,802,664 | Jackson | Aug. 13, 1957 |
| 2,914,089 | Allinquant | Nov. 24, 1959 |

FOREIGN PATENTS

| | | |
|---|---|---|
| 1,075,097 | France | Apr. 7, 1954 |
| 1,076,192 | France | Apr. 21, 1954 |
| 1,094,639 | France | Dec. 8, 1954 |